United States Patent
Sawada et al.

(10) Patent No.: US 6,862,459 B2
(45) Date of Patent: Mar. 1, 2005

(54) SWITCHING DEVICE

(75) Inventors: Masaki Sawada, Osaka (JP); Yasuhiro Yoritsune, Okayama (JP); Yusuke Morinishi, Tokyo (JP); Hirohito Suzuki, Kanagawa (JP); Tomonori Hasegawa, Tokyo (JP)

(73) Assignees: Sony Corporation, Tokyo (JP); Matsushita Electric Industrial Co., Limited, Osaka (JP)

( * ) Notice: Subject to any disclaimer, the term of this patent is extended or adjusted under 35 U.S.C. 154(b) by 629 days.

(21) Appl. No.: 10/002,237

(22) Filed: Nov. 2, 2001

(65) Prior Publication Data

US 2002/0086698 A1 Jul. 4, 2002

(30) Foreign Application Priority Data

Nov. 7, 2000 (JP) ...................................... P2000-339125

(51) Int. Cl.[7] ................................................ H04H 1/00
(52) U.S. Cl. ................. 455/550.1; 455/556; 455/575.1; 455/90.3
(58) Field of Search .............................. 455/566, 575.1, 455/90.3, 550.1

(56) References Cited

U.S. PATENT DOCUMENTS 4,992,631 A 2/1991 Gee .......................... 200/5 A
6,097,964 A * 8/2000 Nuovo et al. ................ 455/566
6,137,477 A 10/2000 Hu .............................. 345/163
2001/0044317 A1 * 11/2001 Prior et al. .................. 455/550

FOREIGN PATENT DOCUMENTS

EP 0901262 3/1999 ............ H04M/1/00
EP 1004957 5/2000 ............. G06F/3/00

* cited by examiner

*Primary Examiner*—Nick Corsaro
*Assistant Examiner*—Khai Nguyen
(74) *Attorney, Agent, or Firm*—Jay H. Maioli (57) ABSTRACT

A switching device having a central actuator and two outer actuators disposed separately from the central actuator on two sides, wherein the central actuator is a cylindrical dial (23) supported rotatably and depressibly by a pair of spindle bearings (26) included in a base plate; the base plate (25) supporting the dial (23) is fitted in a frame; the outer actuators are pivotable in a direction approximately perpendicular to a direction in which the three actuators are arrayed and about a pivot approximately perpendicular to a direction in which operating surfaces of the outer acutators are pushed to press a contact (30) disposed on the frame; and each of the outer actuators has a to-be-supported piece (34) extending to a position where the outer actuator deviates from a lateral edge of the dial (23) in the rotating direction as viewed from the front. The outer actuator is pivotally attached at the end of the to-be-supported piece (34) to the frame (22) and has a center axis crossing the pair of spindle bearings of the central actuator.

1 Claim, 10 Drawing Sheets

SWITCHING DEVICE

BACKGROUND OF THE INVENTION

1. Field of the Invention

The present invention generally relates to a technology to improve the operability of a switching device, and more particularly, to a switching device with three actuators disposed in an array on the top surface of a body.

2. Description of the Related Art

Conventional handy electronic devices such as portable telephones use a so-called jog dial as a switching device for selection of a plurality of options (processes).

Also, there has been proposed a switching device with a jog dial and two pushbuttons disposed apart from the jog dial on both its sides. The two pushbuttons are used to set and carry out a desired one of the options, selected by the jog dial.

However, the above jog dial and two pushbuttons disposed in the foregoing manner are problematic for their poor operability.

The jog dial and two pushbutton switches are normally operated with the same finger (e.g., thumb). However, the jog dial and the pushbutton switches are not configured and positioned with ingenuity so as to make it possible to move the finger smoothly from the jog dial to the pushbutton switches.

OBJECT AND SUMMARY OF THE INVENTION

It is therefore an object of the present invention to provide a switching device having one actuator and two other actuators adjacently disposed on both sides of the one actuator with an improved operability.

The above object can be attained by providing a switching device including one central actuator and two outer actuators disposed apart from the central actuator on both its sides, wherein the central actuator is a cylindrical dial supported rotatably about a pair of spindle bearings of a base plate and depressibly, the base plate supporting the central actuator is disposed as fitted in a frame, each of the outer actuators is pivotable in a direction generally perpendicularly to a direction in which the three actuators are arrayed and about a pivot generally perpendicular to a direction in which the operating surface thereof is pushed, to press a contact disposed on the frame when the outer actuator is pivoted, and each of the outer actuators has a to-be-supported piece extending to a position where the outer actuator is deviated away from the lateral edge of the dial in the rotating direction as viewed from front, and is pivotally supported at the end of the to-be-supported piece on the frame and thus it has a center axis crossing the spindle bearing of the central actuator.

Therefore, in the switching device according to the present invention, since the outer actuators are operated by pivoting and the pivot is made relatively long, so even if the finger pressing the outer actuator is tilted during operation of the actuator, no "prying" will take place in the pressed outer actuator. Thus the switching device with the three actuators can easily be operated with one finger.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIGS. 1 to 4 shows a folding-type portable telephone employing the switching device according to the present invention, in which FIG. 2 is perspective view showing the portable telephone with upper and lower cases thereof being opened from each other.

FIGS. 5 to 9 show the switching device according to the present invention, in which

FIGS. 10 and 11 shows the switching device being operated with a finger, in which

DETAILED DESCRIPTION OF THE PREFERRED EMBODIMENTS

It should be noted that in the embodiments of the switching device according to the present invention includes a jog dial of a portable telephone and two actuators disposed apart from a dial being the actuator of the jog dial on both its sides as shown in the accompanying drawings.

First there will briefly be described the portable telephone as a handy electronic device employing the switching device according to the present invention.

The portable telephone is generally indicated with a reference 1. As shown, the portable telephone 1 includes a body case 2 formed from a synthetic resin and in which various members are housed and installed.

The body case 2 consists of an upper half (will be referred to as "upper case" hereunder) 3 and lower half (will be referred to as "lower case" hereunder) 4. The upper case 3 is hinged (indicated at reference 5) at the lower end thereof to the upper end of the lower case 4. The upper and lower cases 3 and 4 are freely pivotable between a closed position where front sides thereof are closed to each other and an opened position where the front sides are externally viewed. Note that when the upper and lower cases 3 and 4 are in the opened position, the front sides thereof define together an angle of about 160°. In this condition, a part of the lower end of the upper case 3 abuts a part of the upper end of the lower case 4 to limit the cases 3 and 4 from being opened to a larger angle between them.

Provided at the top of the upper case 3 is a telescopic antenna 6 via which the portable telephone 1 transmits and receives radio waves to and from a base station.

Figure 1:
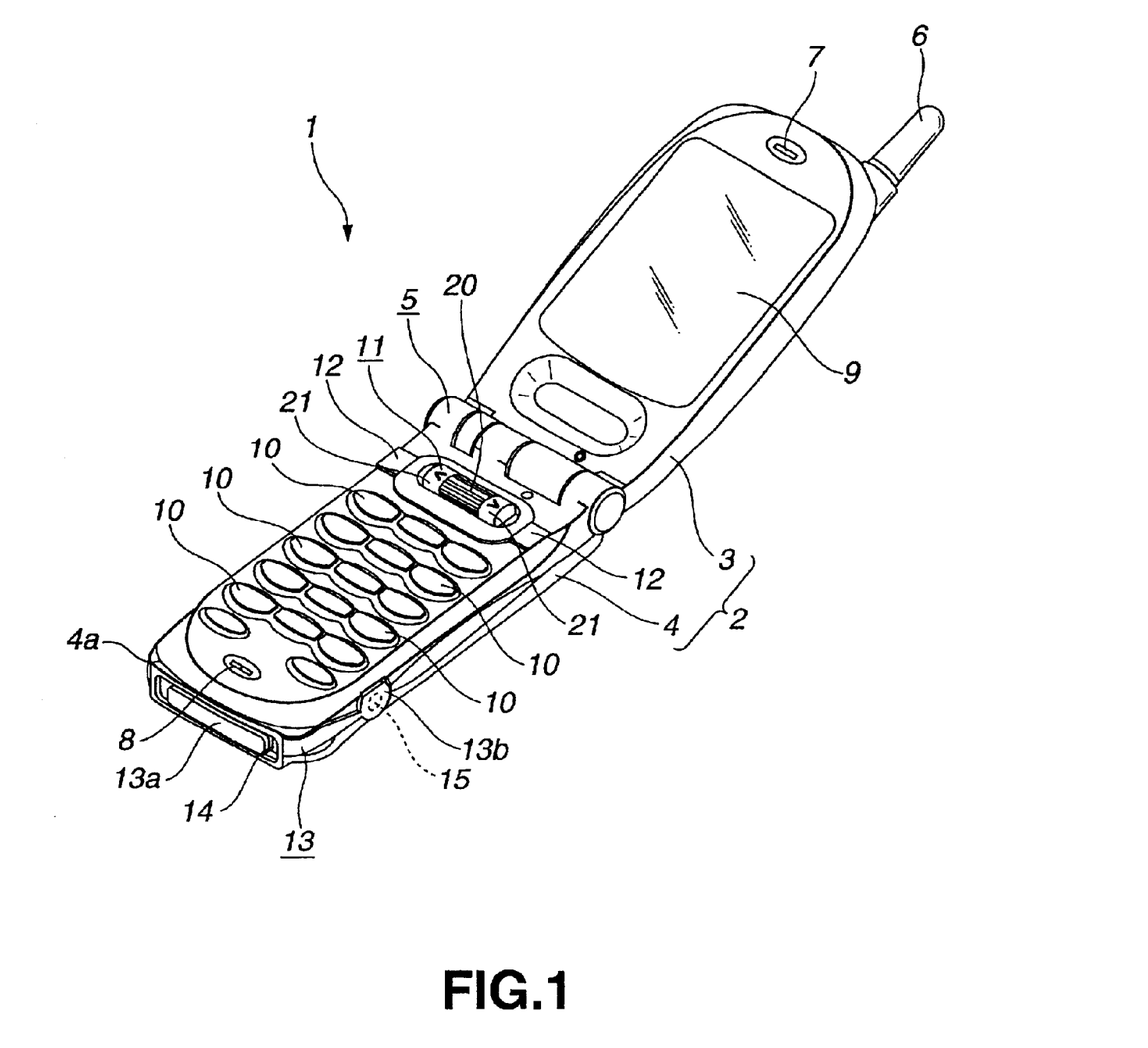
Figure 4:
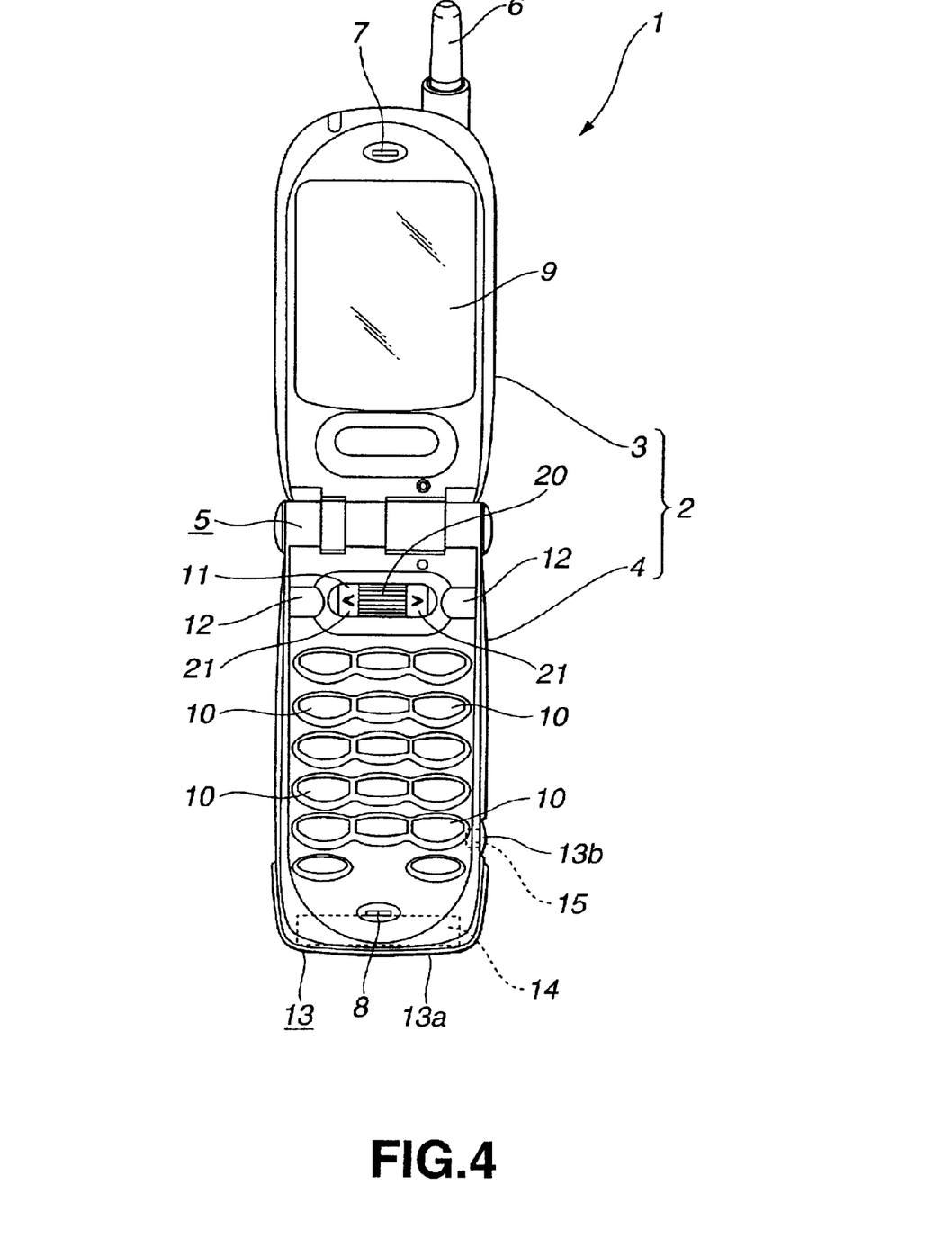
FIG. 4 is a perspective view of the portable telephone in FIG. 1 with the upper and lower cases being opened from each other.
Figure 5:
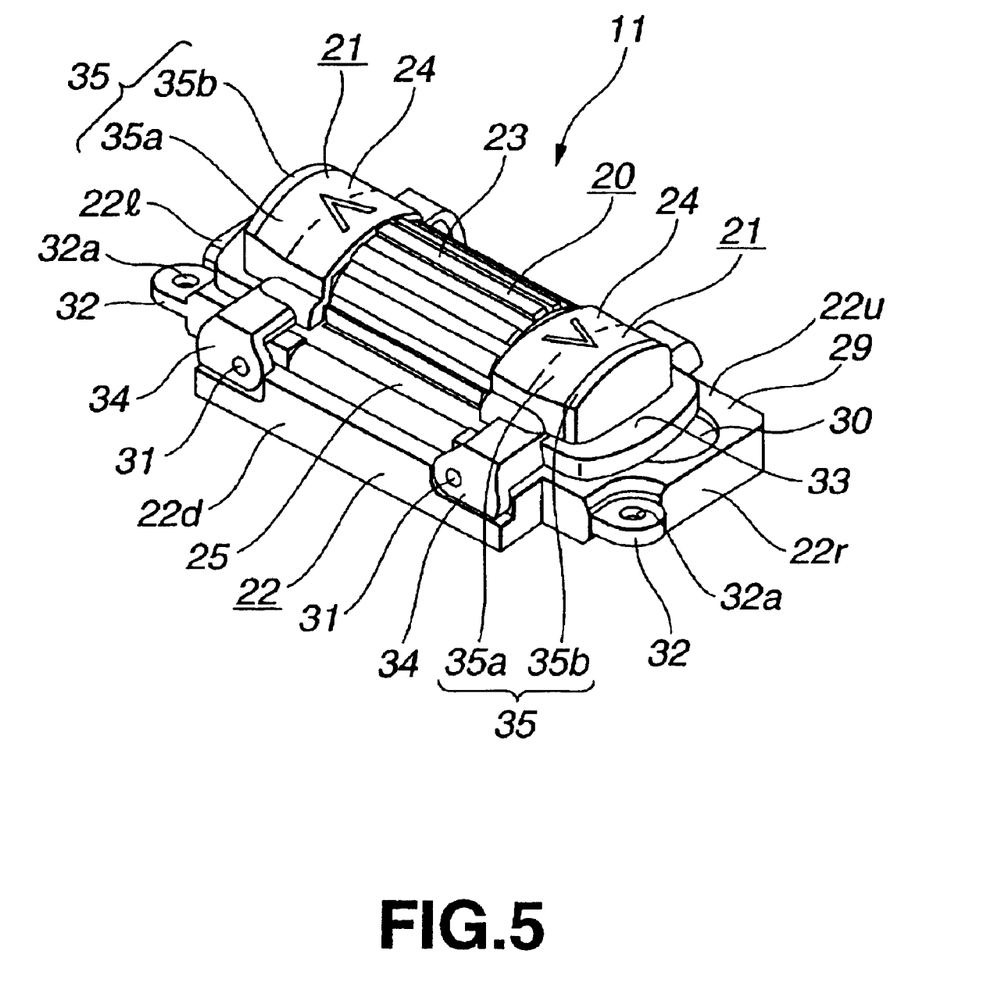
FIG. 5 is a perspective view of the switching device.

There is also provided in the upper front portion of the upper case 3 a speaker 7 as an electroacoustic transducer which outputs a voice of the user of a destination telephone during conversation.

The lower case 4 has provided in the lower front portion thereof a microphone 8 which picks up a voice of the user of the portable telephone 1 during conversation.

Occupying the majority of the front surface area of the upper case 3, a liquid crystal display (LCD) 9 is provided on the upper case 3 to display various pieces of information such as receiving condition of radio waves, remaining battery potential, telephone number of the one the user is talking with, contents of a telephone directory including destinations' phone numbers and names, etc., sending and reception history and other various kinds of registered data.

In the most area of the lower case 4 except for the upper and lower front portions, there are disposed various operating keys 10 as input means. By pushing these operating keys 10, various commands and characters can be supplied to the portable telephone 1.

In the front upper portion of the lower case 4, there is provided a switching device 11 according to the present invention as another input means separately from the operating keys 10.

Pushbutton switches 12 as still other input means are disposed to the right and left of and slightly away from the switching device 11 on the lower case 4.

Figure 2:
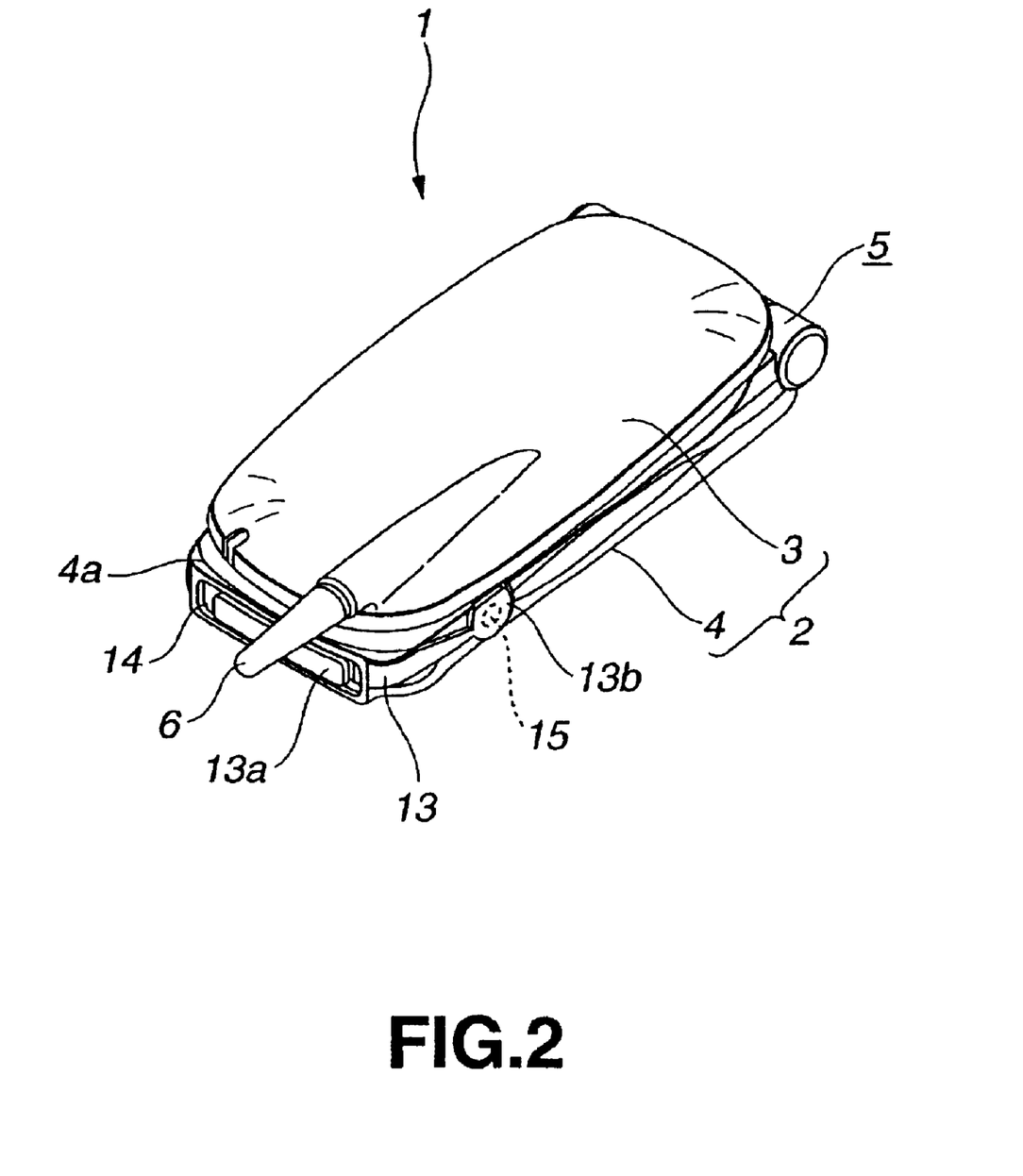
FIG. 2 is a perspective view of the portable telephone in FIG. 1 with the upper and lower cases being closed to each other.
Figure 3:
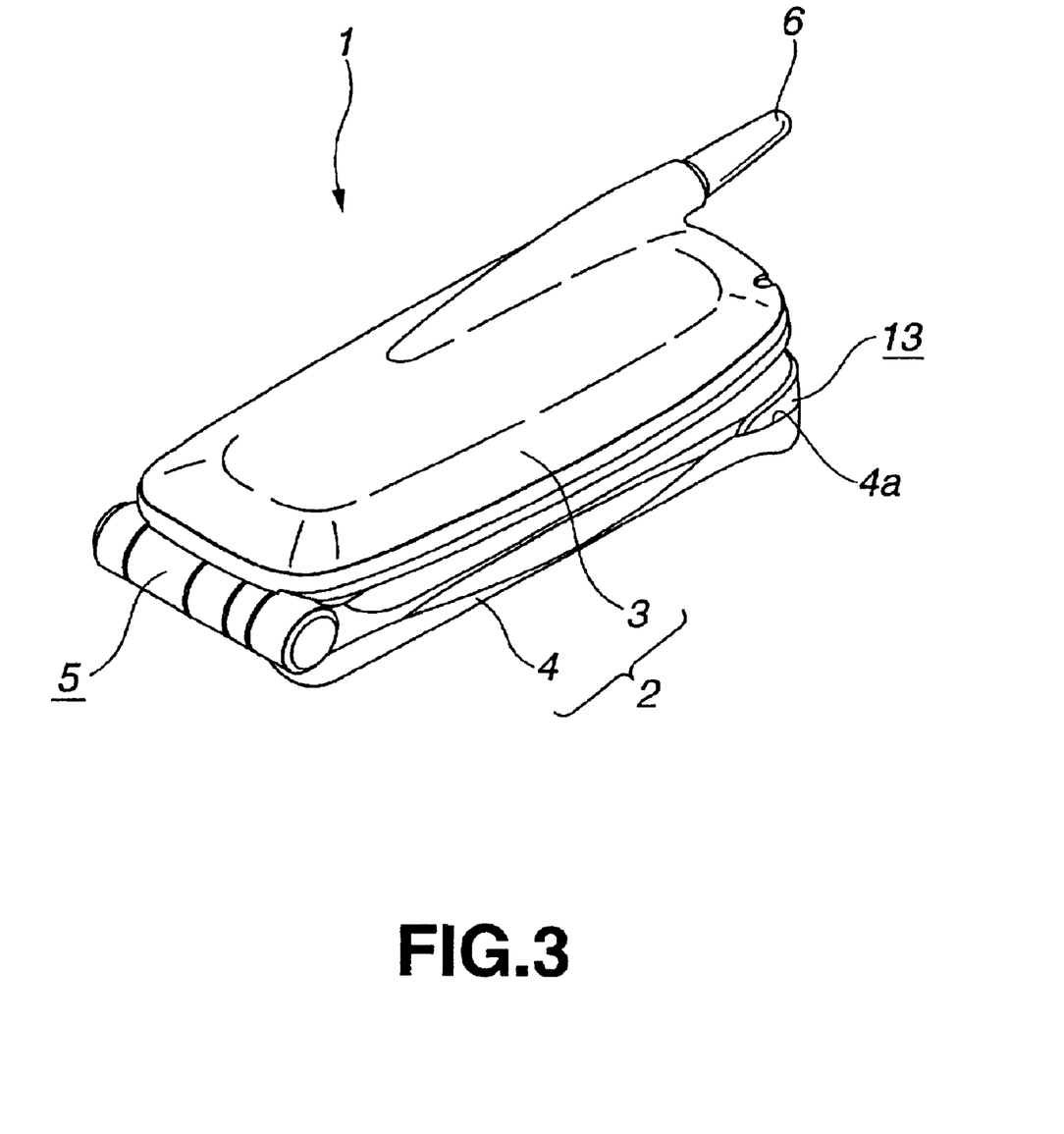
FIG. 3 is also a perspective view, from a direction different from that in FIG. 2, of the portable table in FIG. 1 with the upper and lower cases being closed to each other

An opening 4a is formed in the bottom end face and lower lateral sides of the lower case 4 and a protective member 13 formed from elastomer is attached to cover the lower opening 4a from below and either lateral side of the lower case 4.

There is disposed inside the lower opening 4a of the lower case 4 an interface connector (IF connector) 14 projecting slightly downward from the lower opening 4a.

An earphone jack 15 is provided to the right lateral side of the lower opening 4a in a position slightly above the lower end of the opening 4a.

The protective member 13 attached to the lower end of the lower case 4 covers the lower opening 4a of the lower case 4. It is shaped to have a sufficient size to cover the IF connector 14 as well. Also, the protective member 13 has formed integrally therewith a connector cover 13a which closes the IF connector 14 and an earphone jack cover 13b which closes the earphone jack 15.

The switching device 11 includes a jog dial 20, operating button switches 21 located to the right and left of the jog dial 20, and a rectangular frame 22 to support the jog dial 20 and right and left operating button switches 21 as one unit. Operating buttons 24 as actuators for the operating button switches 21 are disposed in a right-left direction (will be referred to as "horizontal direction" hereunder) apart from a dial 23 as an actuator for the jog dial 20 on both its sides. Note that the dial 23 of the jog dial 20 corresponds to a central actuator as defined in the scope of claim which will be set forth later while the operating buttons 24 of the operating button switches 21 correspond to the outer actuators defined also in the scope of claim.

Figure 8:
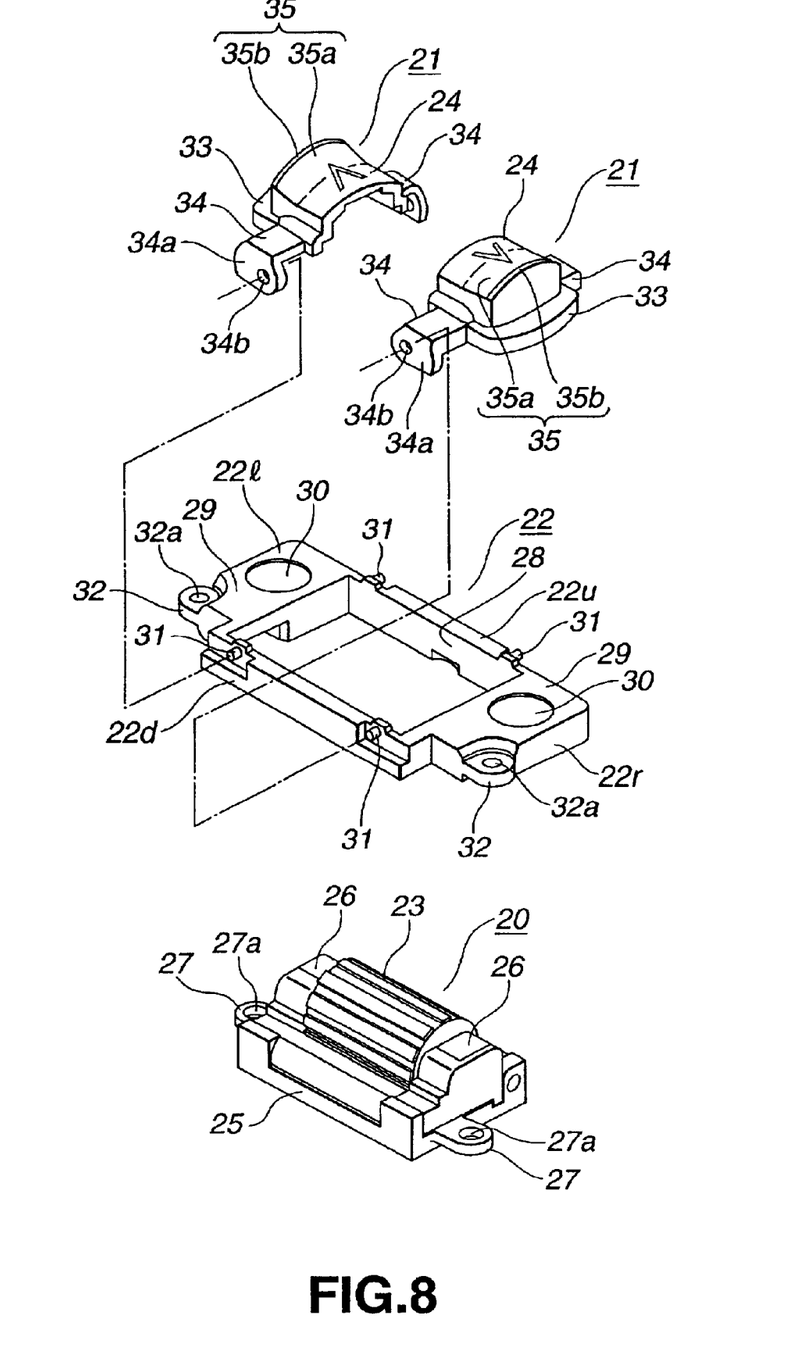
FIG. 8 is an exploded perspective view of the switching device and FIG. 9 is an exploded perspective view, from a direction different from that in FIG. 8, of the switching device.
Figure 9:
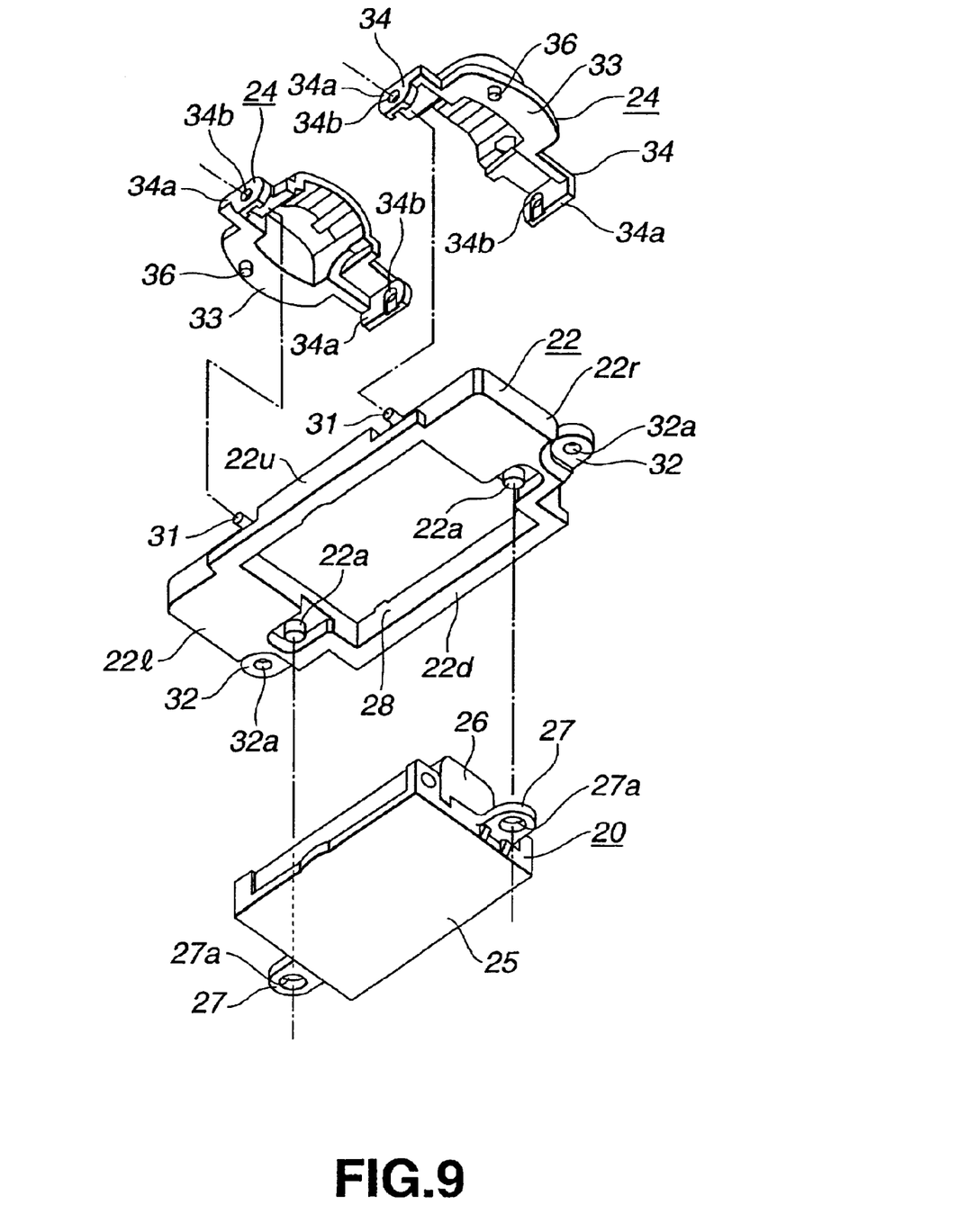

The jog dial 20 includes the above cylindrical dial 23 and a base plate 25 formed from a relatively thick plate and having formed in the middle thereof a concavity in which a lower portion, equivalent to about ⅓ of, the dial 23 laid in horizontal position is received. The base plate 25 includes a pair of spindle bearings 26 rotatably supporting the right and left ends of the dial 23, and also a horizontally (rightward and leftward) projecting tongue pieces 27 to fix the jog dial 20 to the frame 22 of the switching device 11. Note that various contacts (not shown) are provided inside the base plate 25 and encoders etc. are built in the spindle bearings 26.

By rotating the dial 23 of the jog dial 20, it is possible to display, on the LCD 9, various options such as a menu, sending and reception history, telephone numbers list, etc. which can be scrolled for display, and an option selecting cursor, etc.

Also, by depressing the jog dial 20 inwardly of the lower case 4, an option (process) displayed on the LCD 9 can be set or carried out.

Further, by operating the right or left operating buttons switch 21, it is possible to select and carry out a predetermined option. For example, an option once set by pushing the operating button switch 21 can be cleared. By pushing the operating button switch 21, it is possible to raise a menu being displayed by one step in the menu hierarchy or to display a menu caught in the course of a conversation.

In the jog dial 20, small projections 22a formed on the rear side of the frame 22 are fitted in small holes 27a formed in the tongue pieces 27 of the base plate 25 and joined at the free ends thereof to the frame 22 by heat-welding.

The frame 22 consists of frame pieces 22u, 22d, 22r and 22l and has a central jog-dial positioning hole 28 defined by these frame pieces. Each of the frame pieces 22r and 22l at the right and left of the positioning hole 28 has a relatively wide flat portion 29 having a circular contact 30 disposed thereon in a position slightly deviated upward from the center thereof.

Also, a projecting pivot 31 is provided to project through each of the right and left end portions (near the flat portions 29, respectively) of the upper and lower frame pieces 22u and 22d of the frame 22. The projecting pivot 31 is provided vertically correspondingly in position to each of the spindle bearings 26 of the base plate 25 of the jog dial 20.

Note that the pivot 31 corresponds to a pivot of the outer actuator defined in the scope of claim and "direction in which the three actuators are arrayed" defined in claims 3 and 4 corresponds to horizontal direction in this embodiment while "direction in which the operating surface thereof is pushed" corresponds to a direction towards the inside of the lower case 4 in this embodiment. In short, the directions of these pivots 31 are nearly perpendicular to the above horizontal direction and inward direction, namely, vertical directions.

An outward extending to-be-supported piece 32 shaped like tongue piece is formed on the outer edge of each of the right and left frame pieces 22r and 22l of the frame 22 and in a position slightly deviated downward from the center of the frame piece, and a small hole 32a is formed in the to-be-supported piece 32. A small projection (not shown) formed on the rear side of the front half (not indicated with any reference) of the lower case 4 is inserted into the small hole 32a formed in each of the to-be-supported piece 32. Then, the switching device 11 is installed in the lower case 4 by heat-welding, for example, of the free end of the small projection. The dial 23 of the jog dial 20 and operating button 24 of each of the right and left operating buttons switches 21 are projected from the front surface of the lower case 4.

Since the right and left operating buttons switches 21 of the switching device 11 are designed similarly in shape to each other except for their horizontal (right-left) symmetry, only the left-side operating button switch 21 will be described and referred to simply as "operating button switch 21" hereunder. So, any further description will not be made of the right-side operating button switch 21 but the regions and parts of the right operating buttons switch 21 will only be indicated with the same references as those for the corresponding regions and parts of the left operating button switch 21.

The operating button switch 21 includes an operating button 24 designed to have a semi-cylindrical appearance closed at the top and bottom and right and left thereof, a pressing piece 33 projected to the left from the rear edge of the operating button 24 and positioned in an anterior part of the flat portion 29 of the frame 22, and to-be-supported pieces 34 projected upward and downward, respectively, from the front edge of the operating button 24 and also projected at the front edges thereof towards the rear side of the operating button 24.

The operating button 24 is also designed to have a sufficient size to cover the front, top and bottom and left side of the spindle bearing 26 of the jog dial 20 from the side opposite to the dial 23. The front side, or top, of the operating button 24 is an operating surface 35 which is to be pushed with a finger F as will further be described later.

Figure 7:
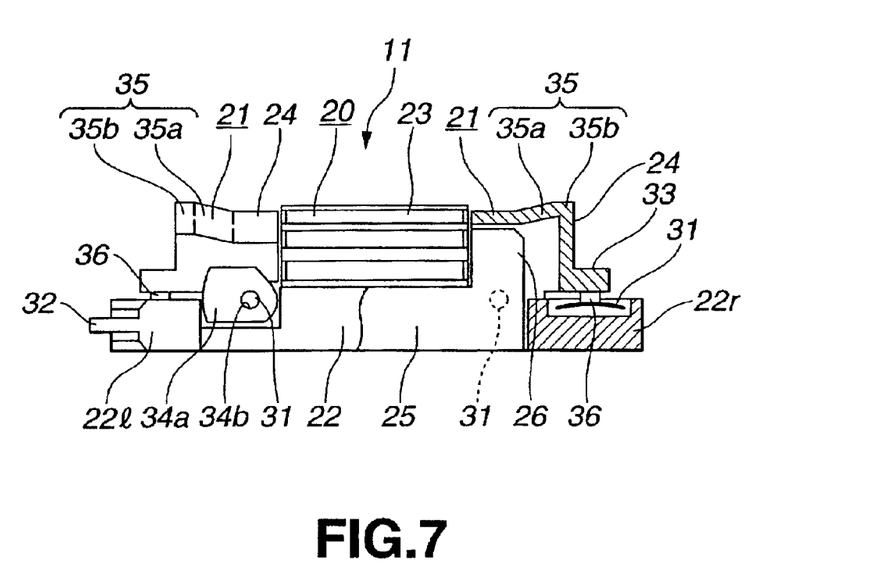
FIG. 7 is a partially fragmentary bottom view of the switching device.

The pressing piece 33 has a small convexity 36 formed on the rear side thereof in a position corresponding to the above-mentioned circular contact 30. As will be described later, when the operating button 24 is pushed, the small convexity 36 will press the contact 30 to turn on the operating button switch 21.

Each of the to-be-supported pieces 34 has provided at the end portion thereof a small piece 34a opposite to a one provided on the mating to-be-supported piece 34. The small piece 34a has formed therein a small hole 34b in which each pivot 31 in the frame 22 is fitted, whereby the operating button switch 21 is pivotally supported on the frame 22. Note that the present invention is not limited to this manner of pivotal supporting of the operating button switch 21 but the small hole may be formed at the frame 22 while the button spindle may be provided at each to-be-supported piece 34, for such a pivotal supporting.

That is to say, the operating button switch 21 is pivotally supported on the frame 22 in a position slightly deviated vertically and outwardly from the width of the dial 23 in the rotating direction (width in a direction perpendicular to the pivot). They are supported by means of each to-be-supported piece 34 to the frame 22. Thus, the operating button switch 21 can easily be assembled with a reduced number of working steps.

Figure 6:
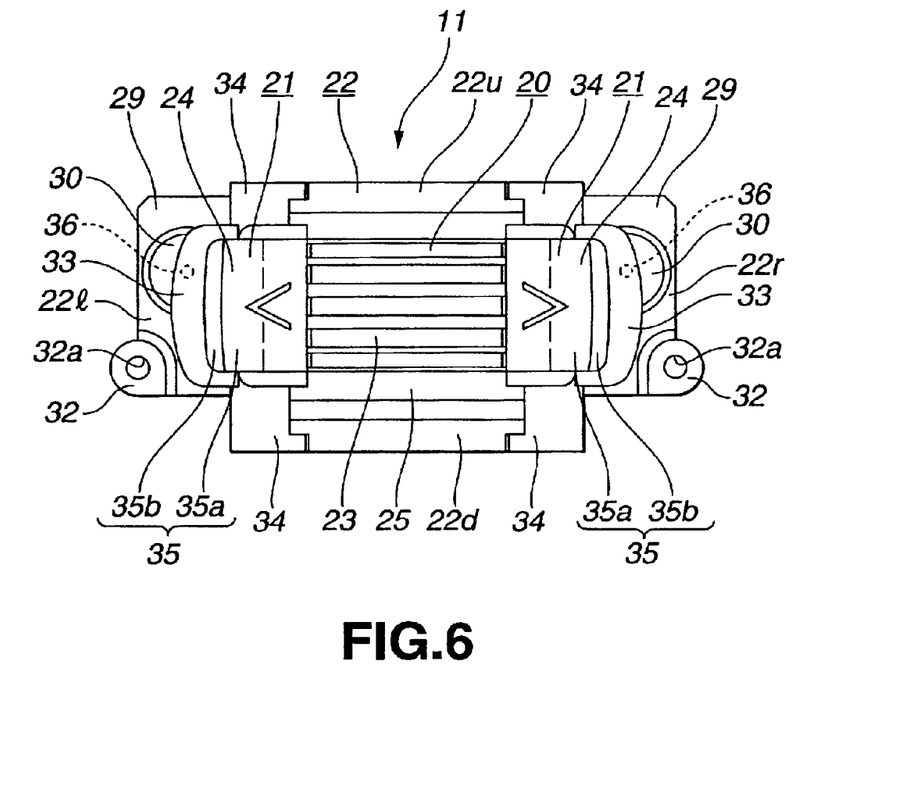
FIG. 6 is a front view of the switching device.

The operating surface 35 of the operating button 24 is vertically circular, namely, upwardly convex, at the right portion thereof and has a circumference of a curvature equal to or smaller than that of the circumference of the dial 23. It includes a sloped portion 35a rising more to the front as it goes towards the left thereof and a flat portion 35b provided at the left end portion of the operating surface 35 and whose outward projection is not varied from end to end.

The term "sloped" of the sloped portion 35a or "flat" of the flat portion 35b describes the edge line of the operating button 24 as sloped or flat as viewed from below. Actually, the sloped portion 35a of the operating surface 35 is fanned out to the front as it goes leftward.

In this embodiment, the sloped portion 35a has a slope gradually rising more starting at the middle of the operating button 24 in the horizontal direction. However, the present invention is not limited to this structure of the operating button 24 but a sloped surface may be formed starting at the end of the operating button 24 near the side of the jog dial 20.

Supported pivotally on the frame 22 as in the above, the operating button switch 21 covers the spindle bearing 26 of the jog dial 20 in the space inside the operating button 24. Thus, the right edge of the operating surface 35 is positioned near the left circumferential edge of the dial 23 of the jog dial 20. Also, the small convexity 36 formed on the pressing piece 33 of the operating button switch 21 is in contact with or in vicinity of the contact 30.

The switching device 11 in which the jog dial 20 and operating button switches 21 are unified as in the above is installed to the lower case 4 from inside of the latter, and the dial 23 and right (left) operating button 24 are disposed to project a little from the surface of the lower case 4.

Figure 10:
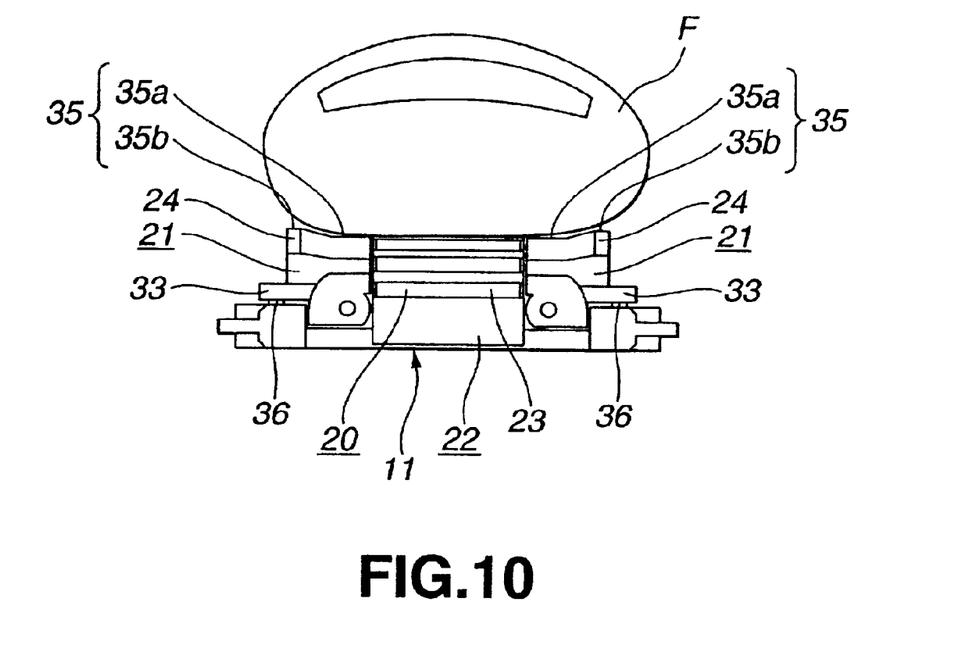
FIG. 10 is a bottom view of the switching device, showing the central actuator being operated

Thus, for operating the jog dial 20, the dial 23 thereof is rotated up or down with the pad of the finger F or depressed inwardly of the lower case 4.

Figure 11:
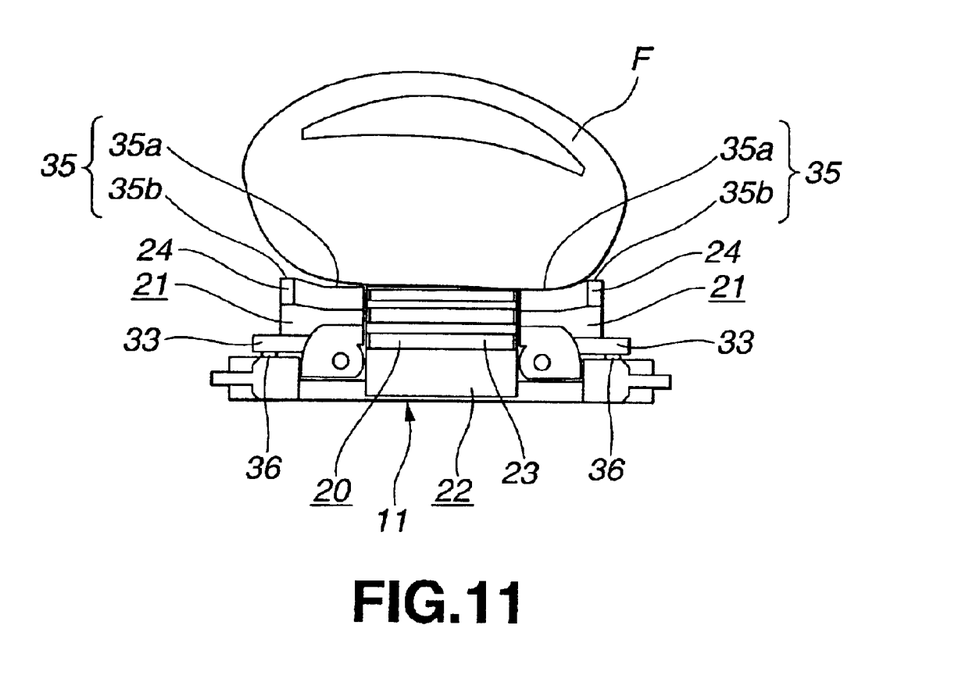
FIG. 11 is a bottom view of the switching device, showing the finger being shifted from the central actuator to the outer actuator.
Figure 12:
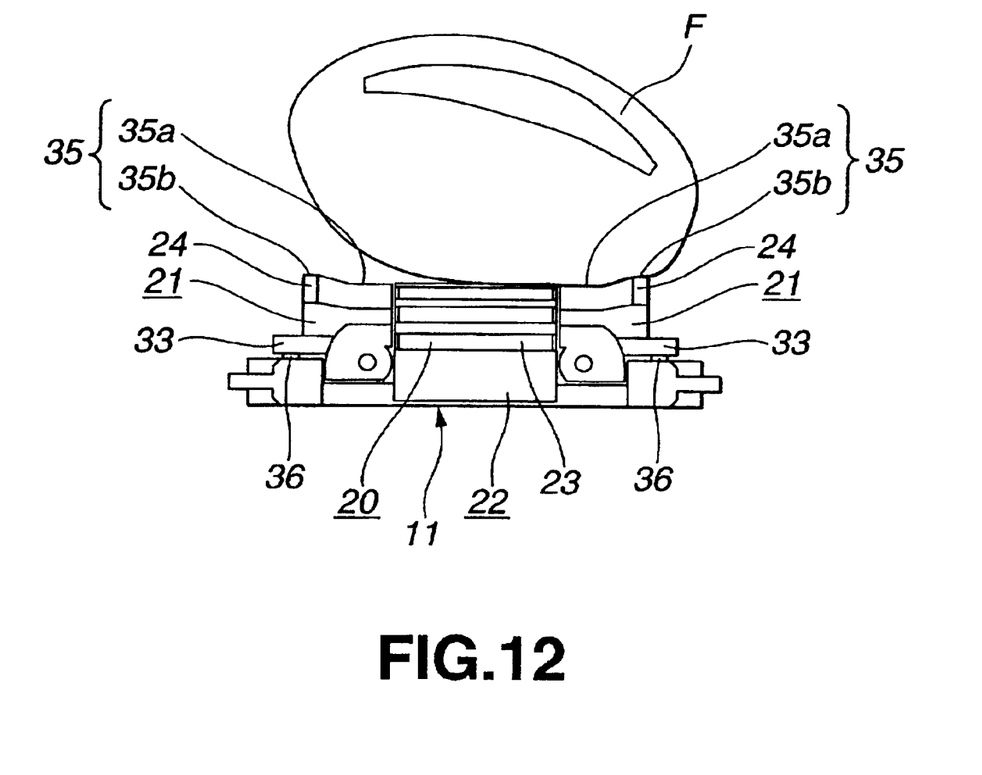
FIG. 12 is a bottom view of the switching device, showing the outer actuator being operated.

For operating the right or left operating button switch 21, the finger F placed on the dial 23 is moved to roll to the right or left and the operating surface 35 of the operating button 24 is pushed with a portion of the finger F, a little deviated to the lateral side from the finger pad. The operating button switch 21 thus pushed is pivoted about the pivot 31, the outer portion thereof (pressing piece 33) is pushed inwardly of the lower case 4, and the projecting small convexity 36 provided on the rear side of the pressing piece 33 presses the contact 30 on the frame 22 to turn on the operating button switch 21.

At this time, the central axis of pivoting of the operating button switch 21 will cross the small piece 34a of the to-be-supported piece 34 and the spindle bearing 26 of the dial 23.

As in the above, since the operating button switch 21 is pivotally supported on the frame 22 by means of the vertically and outwardly projecting to-be-supported piece 34 in a position deviated vertically and outwardly from the width of the dial 23 in the direction of rotation (width in the direction perpendicular to the pivot), so the central axis of pivoting can be made relatively long and thus even when the finger pushing the operating button switch 21 is inclined, the operating button switch 21 can positively be pushed without occurrence of any "prying". Namely, the switching device 11 according to the present invention can be said to have a good operability.

More specifically, if the finger pushing the operating button switch 21 is inclined when the distance between points at which the operating button switch 21 is pivotally supported is reduced, "prying" will develop in the operating button switch 21, so that the operating button switch 21 cannot be pushed positively in a desired direction. Owing to the relative long central axis about which the operating button switch 21 is pivotable, however, such a "prying" will not take place, that is, the operating button switch 21 can positively be pushed.

When the finger F placed on the dial 23 is moved to the left or right to rotate the dial 23, the pad of the finger F is in contact with the dial 23 while the portion of the finger F pushing the operating button 24 is moved outwardly to roll on, and in contact with, the sloped portion 35a of the operating surface 35. When the main portion of the finger F rides on the flat portion 35b of the operating surface 35, the force applied on the flat portion 35b inwardly to the lower case 4 increases so that the operating button switch 21 will be pivoted and the small convexity 36 press the contact 30. Therefore, the flat portion 35b of the operating surface 35 functions to make easier the operation of the operating button switch 21. Otherwise, the force to pivot the operating button switch 21 will not develop unless the finger F is moved rather long on the sloped portion 35a of the operating surface 35 to the right or left, with the result that the operating button switch 21 cannot be operated very well.

For operating the right or left operating button switch 21, the outer portion thereof (left end of the left operating button switch 21 or right end of the right operating buttons switch 21) is pushed. Thus, the dial 23 will not be pushed. Namely, two pushbuttons will not be pushed together.

More particularly, even if it is tried to push the end portion, near the dial 23, of the operating button 24, that portion cannot be pushed towards the rear side (inwardly of the lower case 4) since each of the right and left operating button switches 21 has the fulcrum of pivoting thereof (pivot 31) located at the side of the dial 23. Therefore, when trying to operate either of the operating button switches 21, the finger F going to push the operating button switch 21 has already been away from the dial 23 or no force will be applied in at least a direction in which the dial 23 is pushed. Even if the finger F is in contact with the dial 23, the latter cannot be depressed towards the rear side (inwardly of the lower case 4) and thus two pushbuttons can be prevented from being pushed together.

This is also true for depressing the dial 23 inwardly of the lower case 4. Namely, when the finger F is put in contact with either of the right and left operating buttons 24, the dial 23 can be depressed inwardly of the lower case 4 but the operating button switch 21 will be blocked by the pivot 31 and thus will not be depressed inwardly of the lower case 4. That is, it can be avoided that two pushbuttons will be pushed together.

In the above switching device 11, each of the actuators (dial 23 and operating buttons 24) should desirably be 15 mm to 25 mm in dimension in the direction in which they are arrayed. The reason for the above is that because of the geometry of the switching device 11 according to the present invention in the portable telephone 1, the finger F of the user operating the actuators 23 and 24 is the thumb. Generally, the male human being's finger is 20 mm to 25 mm wide while the female human being's finger is 15 mm to 20 mm wide. In view of the above, the switching device 11 will show an easier operability.

It is assumed here for example that the switching device 11 is designed to have a size of 20 mm. In this case, the dial 23 may be 9 mm in length while each of the operating button switches 21 may be 5.2 mm in length, the gap between the dial 23 and operating button switch 21 be 0.3 mm, the sloped portion 35a of the operating surface 35 of the operating button switch 21 be 4.3 mm and the flat portion 35b of the operating surface 35 may be 0.9 mm in length.

In addition, the horizontal dimension of the switching device 11 can be determined according to the above-mentioned width of human being's finger F, but it is desirable to determine it taking the width of the portable telephone 1 in consideration.

In the switching device 11, the two operating button switches 21 are disposed apart from the dial 23 on both its sides. However, since these three actuators (dial 23 and operating button switches 21) are disposed in vicinity of each other, the switching device 11 can be used with an improved operability and the dimension of the switching device 11 in the direction in which the three actuators are arrayed can be reduced. Therefore, by adopting the switching device 11 according to the present invention, the terminals such as portable telephones can naturally be reduced in horizontal (right-left) dimension and also another switch, for example, the pushbutton switches 12 included in this embodiment can be disposed in the terminal.

Note that the shape and structure of each component included in the above embodiment are just examples to which the present invention is not limited, and thus the technological scope of the present invention should never be interpreted limitedly.

What is claimed is:

1. A switching device including one central actuator and two outer actuators disposed separately from said central actuator, one of said two outer actuators located on each of two sides of said central actuator, wherein:

said central actuator is a cylindrical dial supported depressibly and rotatably by a pair of spindle bearings of a base plate;

said base plate supporting said central actuator is fitted in a frame;

each of said two outer actuators is pivotable in a direction approximately perpendicular to a direction in which said central actuator and said two outer actuators are arrayed and about a pivot approximately perpendicular to a direction in which an operating surface of each of said two outer actuators is pushed to press a contact disposed on said frame when each of said outer actuators is pivoted;

each of said two outer actuators has a to-be-supported piece extending to a position where said outer actuator deviates from a lateral edge of said central actuator in a rotating direction as viewed from a front; each of said two outer actuators is pivotally attached at an end of said to-be-supported piece to said frame; and each of said two outer actuators has a center axis that crosses one of said pair of spindle bearings of said central actuator.

* * * * *